United States Patent [19]

Conley

[11] 4,284,451
[45] Aug. 18, 1981

[54] TIRE REPAIR METHOD AND APPARATUS

[76] Inventor: Glenn R. Conley, 250 E. Wood St., New Lenox, Ill. 60451

[21] Appl. No.: 118,177

[22] Filed: Feb. 4, 1980

[51] Int. Cl.³ .............................................. B29H 5/17
[52] U.S. Cl. ...................................... 156/97; 156/272; 219/202; 219/243; 219/481; 219/528; 219/539; 425/14
[58] Field of Search ....................... 156/95, 96, 97, 98, 156/272, 394; 425/11, 14, 15, 17, 26; 219/201, 202, 243, 481, 528, 529, 539

[56] References Cited

U.S. PATENT DOCUMENTS

| 1,866,785 | 7/1932 | Woock | 219/528 |
| 2,929,909 | 3/1960 | Gibbs | 156/96 |
| 3,038,984 | 6/1962 | Snyder | 219/243 |
| 3,779,833 | 12/1973 | Reppel | 156/394 |
| 3,940,463 | 2/1976 | Nicholson | 264/36 |

*Primary Examiner*—John E. Kittle
*Attorney, Agent, or Firm*—Ernest S. Kettelson

[57] ABSTRACT

A method of tire repair in which flexible heating pads are applied to both the inside and outside of a patch area of a tire casing, and held in place under equalized pressure against the patch area by inflatable means. An inner tube is the inflatable means to hold a first flexible heating pad against the inner wall of the casing and patch area, and an inflatable air bag is the inflatable means to hold a second flexible heating pad against the outer wall of the casing and patch area. A belt or girdle of flexible sheet material surrounds the inflatable air bag and casing to force the air bag against the second flexible heating pad when it is inflated. The flexible heating pad for use on the inside of the casing includes a structure which enables the heating pad to conform to the interior surface of the casing and patch area and maintain contact therewith throughout the heating surface area of the heating pad when the inner tube is inflated. Such structure includes a plurality of segments of electrical heat tape loosely supported in individual nylon pockets which allow the heat tape segments to move laterally and longitudinally as the heating pad is pressed into engagement with the patch inside of the tire casing. The electrical conductors leading from the inner or first heating pad to the outside are enclosed in a protective floating sheath which becomes tightly sandwiched between the tire casing and the rim at the point where the conductors exit from the inner heating pad for connection to an exterior electrical source. Such protective floating sheath permits the electrical conductors to move sufficiently as the tire grows during the heating process, and the inner heating pad is moved correspondingly under pressure of the inner tube to maintain close contact therewith. As this happens, the electrical conductors would otherwise be stretched to the breaking point in the absence of the protective floating sheath.

3 Claims, 9 Drawing Figures

U.S. Patent  Aug. 18, 1981  Sheet 1 of 3  4,284,451
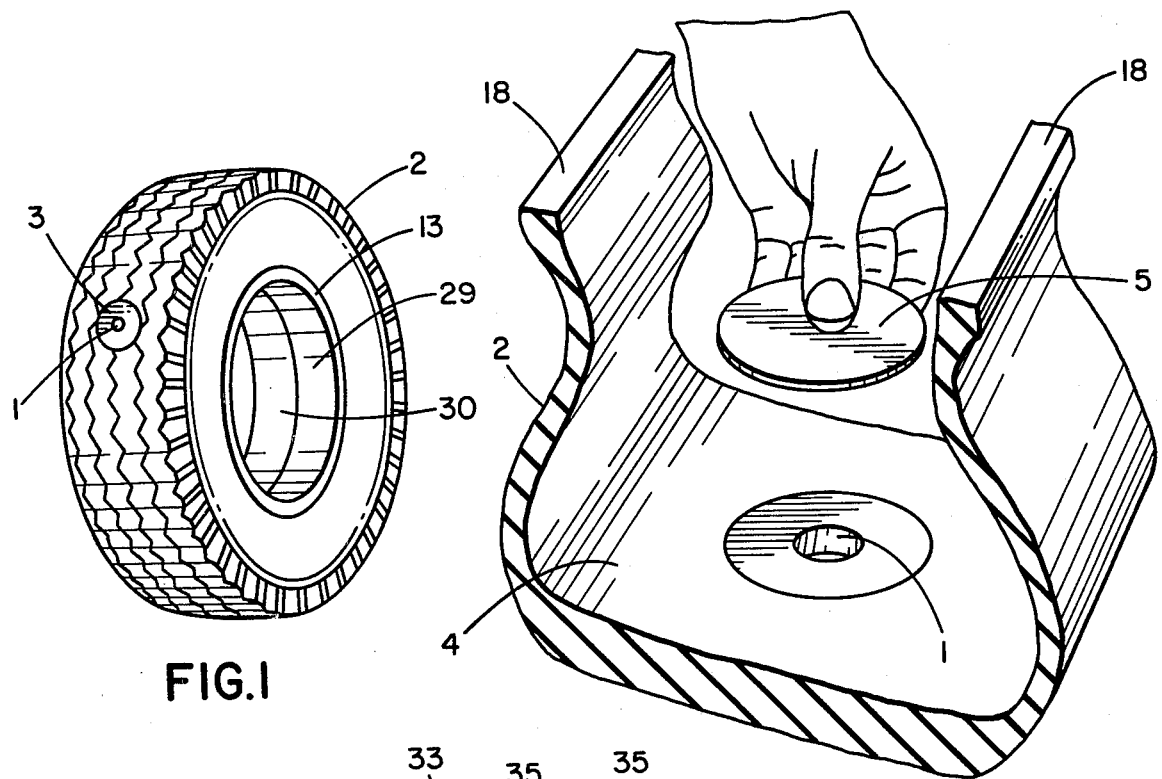
FIG.1
FIG.2
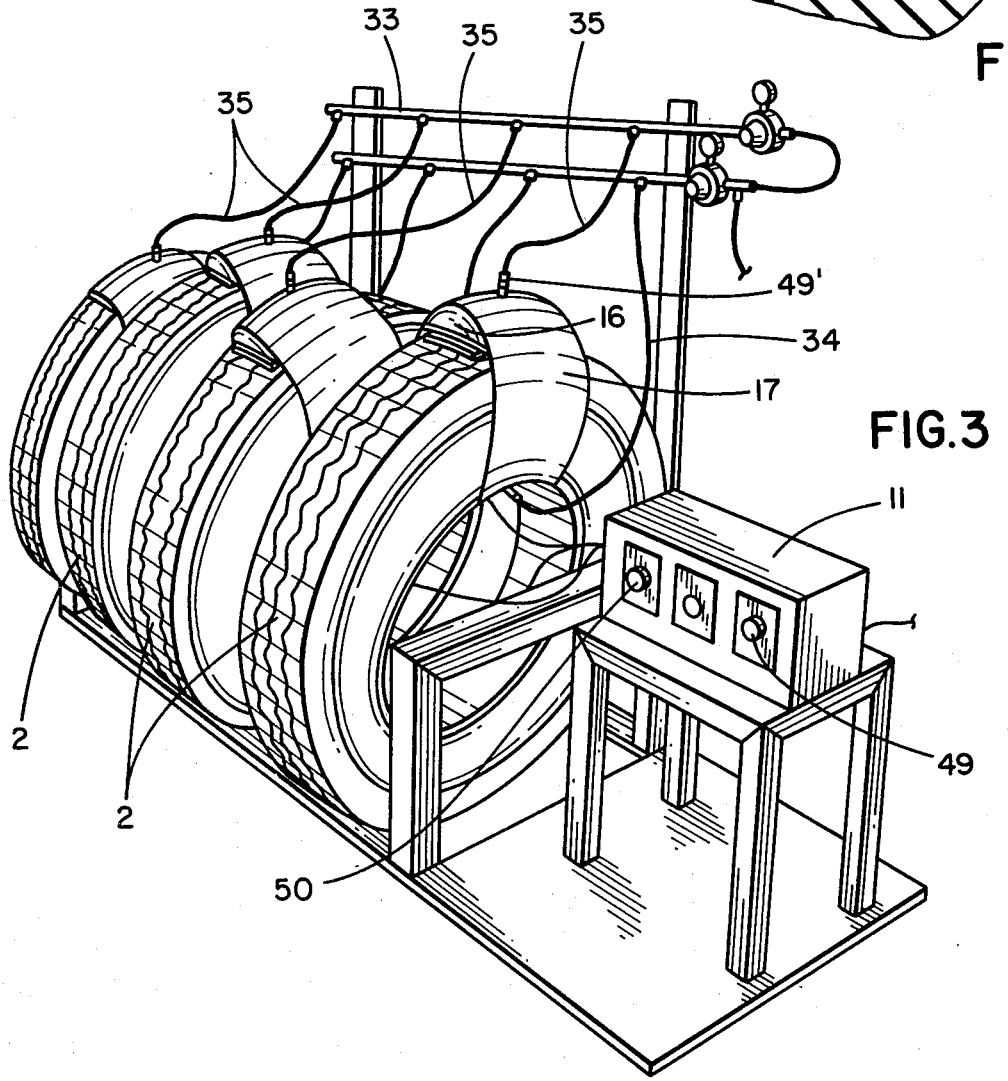
FIG.3

TIRE REPAIR METHOD AND APPARATUS

BACKGROUND OF THE INVENTION

This invention relates to the field of repairing major cuts or wounds in vehicle tires, which require vulcanizing a sizable patch to the interior of the casing and a plug of vulcanizing compound such as cushion gum in a skived portion of the cut or wound of the casing. Prior art methods of making such tire repairs included placing a repair patch in the damaged area of the tire and then curing by means of two electrical heating pads. During the curing process, the tire must be properly supported and various methods for supporting the tire have been used. One method has been to position a rigid core inside the tire to support one of the heating pads against the inside of the tire and to place an inflatable bag against the outside of the tire and over the other heating pad to hold it in place on the outside of the tire casing. The inflatable bag in such prior art method is mounted in a large heavy cavity mold which extends around the tire casing about one-third of its circumference. The inflatable bag is supported on the side which is away from the tire so the bag can be pressurized to place the outside heating pad against the tire and in turn the tire against the core and the inner heating pad. While this method is satisfactory in many respects, the cavity mold is a very heavy item of equipment which may weigh as much as several tons and is correspondingly expensive.

As for the rigid core placed inside of the tire in accordance with this previously known method, it may be typically either of aluminum or wood which are relatively heavy materials. Consequently cores for larger size tires become so large and heavy that they are difficult to handle by the workman. The cores for very large tires such as for earth moving machines may be as much as four feet long and two and one-half feet in diameter. Another major disadvantage of such cores used in the prior art method is that each core is useable with only one size of tire. Therefore, a large number of cores are required for a repair shop to be in a position to repair tires of various sizes which becomes expensive and also requires considerable storage space to keep a number of different size cores on hand.

The method and apparatus for repairing tires in accordance with the present invention overcomes a number of the problems associated with the prior art method. The method and apparatus disclosed herein is relatively inexpensive and comparatively lightweight, utilizing flexible sheet inflatable means both inside and outside of the tire casing to support flexible heating pads against both the inside and outside of the tire casing in the area of the patch. Furthermore, the flexible sheet inflatable means are held in place against the tire by a flexible belt or a girdle surrounding the patch assembly. Since virtually the entire patching materials and apparatus for holding it in place during the curing process consists of flexible sheet material, the weight is substantially less than that of the heavy cavity molds and cores used in prior art methods. Furthermore, by utilizing apparatus which is made of flexible sheet material, it is possible and relatively easy to adapt the same items for use in repairing tires of different sizes.

Another disadvantage of the rigid cavity molds and cores or mandrels of prior art methods is that they do not flex and conform to the exact circular configuration of the tire casing during the curing process. Therefore in order to maintain close contact between the rigid elements of the repair apparatus, comprising the core or mandrel on the inside and cavity mold on the outside, with the respective inner and outer surfaces of the tire casing it is necessary to use extra pressure at times which deforms the tire casing, even if only slightly. Such extra pressure during the curing process, and such deformation of the tire casing even though relatively slight, is enough to make the tire casing slightly "out-of-round" after the repair. The present invention overcomes this problem also, since the flexible sheet elements utilized in the present method readily conform themselves to the arcuate surface of both the inside and outside of the tire casing to maintain close intimate contact therewith by both the inner and outer heating pads throughout the curing process.

SUMMARY OF THE INVENTION

It is an object of the invention to provide apparatus for making repairs to tire casings in which the component parts of the repair apparatus are of relatively light weight flexible sheet material.

It is an object of the invention to provide apparatus for making repairs to tire casings, comprising flexible inner and outer heating pads, and flexible inner and outer inflatable means to hold said inner and outer heating pads against respective inner and outer surfaces of the tire casing in the area being repaired.

It is an object of the invention to provide apparatus for making repairs to tire casings, comprising flexible heating pads held in place under equalized pressure against the inner and outer surfaces of the tire casing in the area being repaired, utilizing an inner tube to hold the inner heating pad in place, a flexible inflatable bag to hold the outer heating pad in place, and a girdle of flexible sheet material to hold the flexible inflatable bag in place over the outer heating pad to apply pressure thereto as such bag is inflated.

It is an object of the invention to provide apparatus for making repairs to tire casings, comprising flexible components which conform to the arcuate surfaces of the tire casing while under pressure throughout the curing phase of the repair process without any deformation thereof.

It is an object of the invention to provide apparatus for making repairs to tire casings, including a protective floating sheath to protect and permit slight movement of the electrical conductors leading from an exterior electrical source to an inner electrical heating pad inside of the tire casing between the annular bead of the tire casing and the tire rim on which it is mounted.

It is an object of the invention to provide an improved method of repairing tire casings in which substantially equalized pressure is maintained against both inner and outer surfaces of the tire casing in the repair area while heat is applied thereto, without deformation of the arcuate configuration of the casing while such pressure is being applied.

It is an object of the invention to provide an improved method of repairing tire casings in which flexible heating pads and flexible inflatable support means are applied to the inner and outer surfaces of the tire casing in the repair area, wrapping a flexible belt around the outer support means and outer heating pad and securing the same whereby pressure is applied to the outer heating pad when the outer support means is inflated.

BRIEF DESCRIPTION OF THE DRAWING

FIG. 1 is a perspective view of a tire casing mounted on a rim, having a puncture to be repaired in accordance with this invention, shown from outside of the casing.

FIG. 2 is an enlarged fragmentary view of that portion of the tire casing having a puncture therein, showing the puncture from inside of the casing.

FIG. 3 is a perspective view of a plurality of tire casings having apparatus in accordance with this invention mounted thereon to repair punctures in such tire casings.

DESCRIPTION OF THE PREFERRED EMBODIMENT

Figure 4:
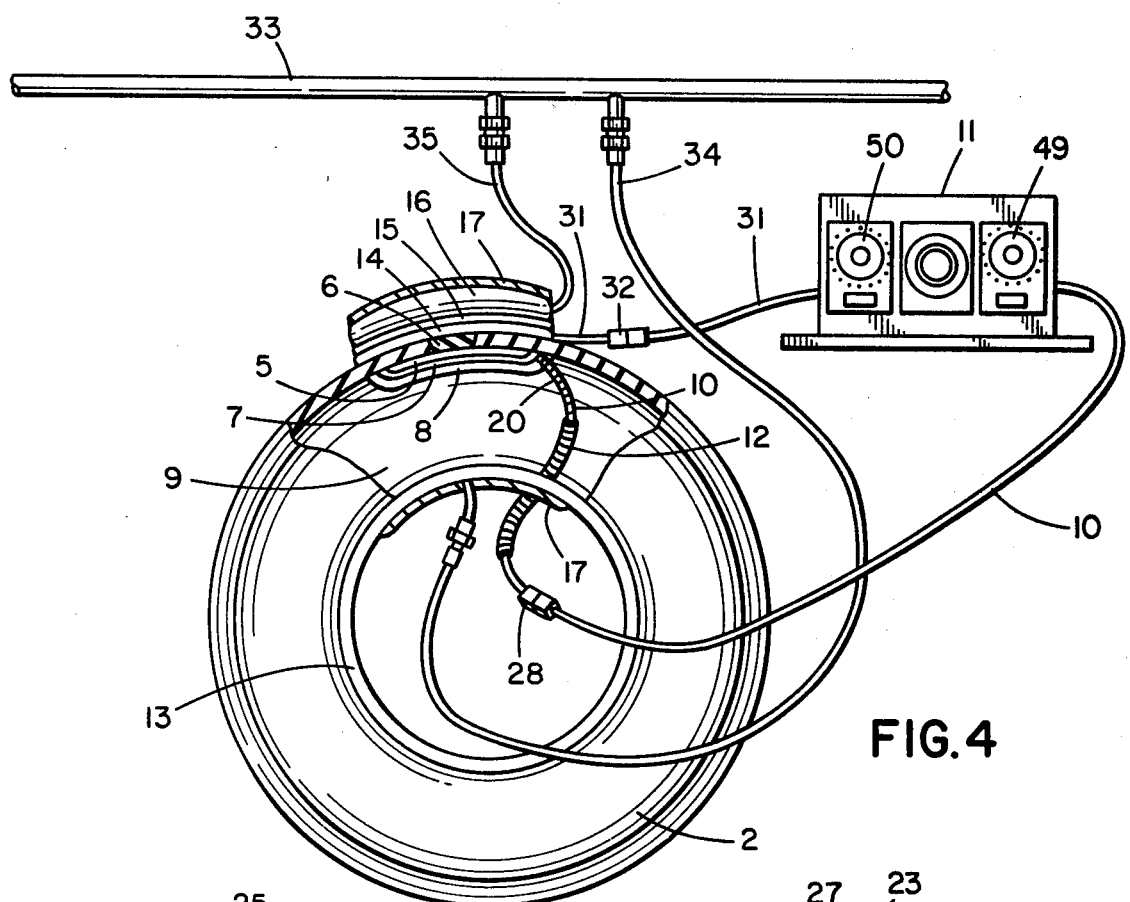
FIG. 4 is an elevation view of one tire casing being repaired as shown in FIG. 3, with a portion broken away to illustrate the placement of portions of the repair apparatus inside of the casing.
Figure 5:
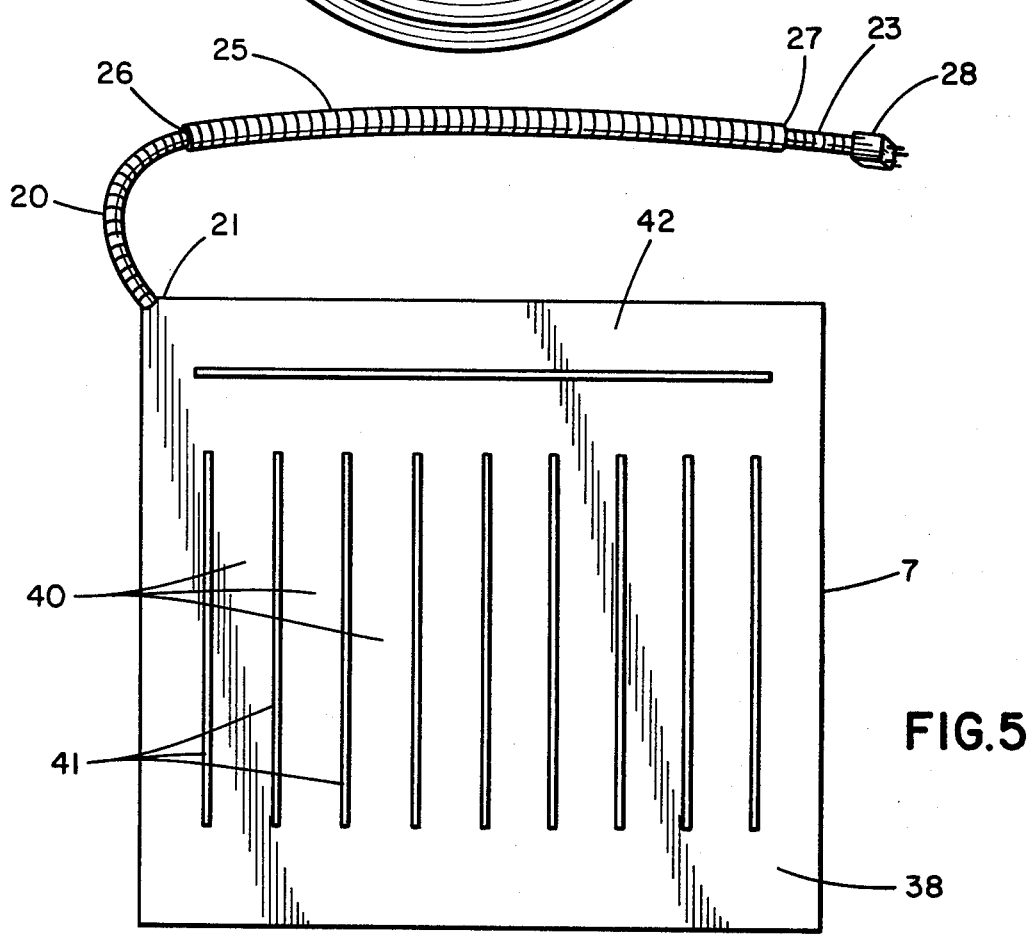
FIG. 5 is a plan view of a flexible inner heating pad in accordance with this invention.
Figure 6:
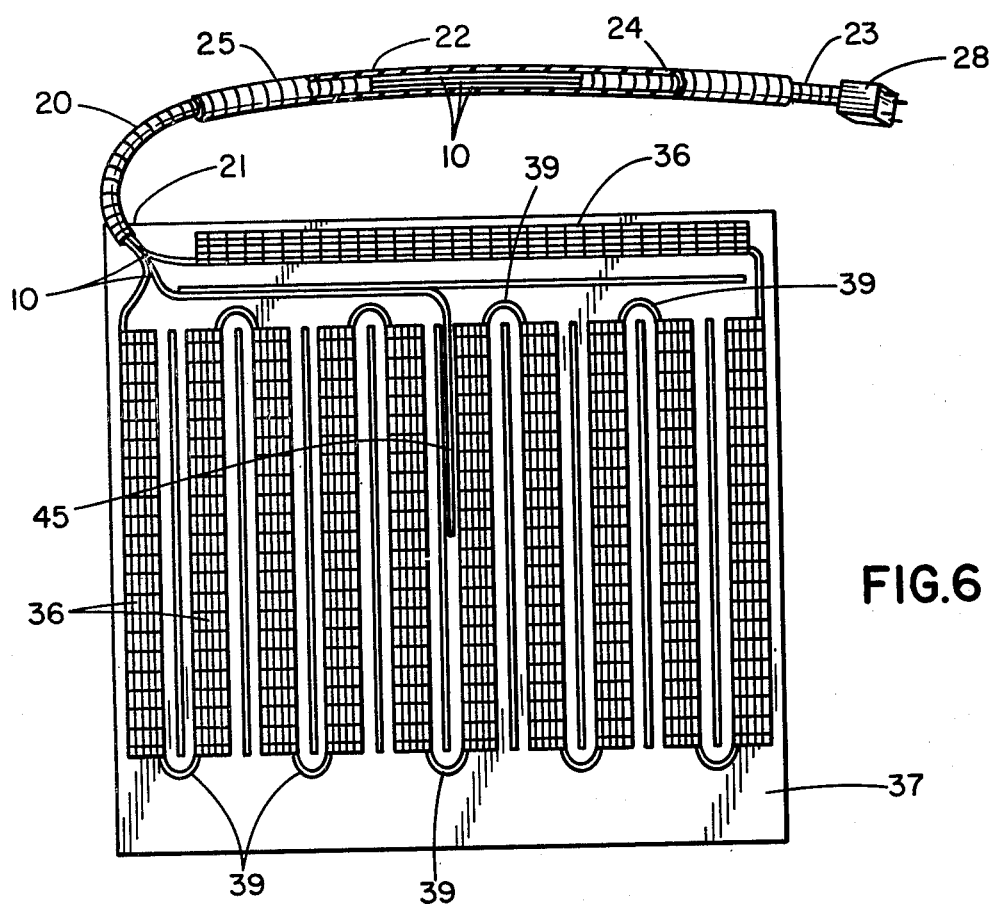
FIG. 6 is a plan view of the flexible inner heating pad of FIG. 5 with the top ply of flexible sheet material removed.
Figure 7:
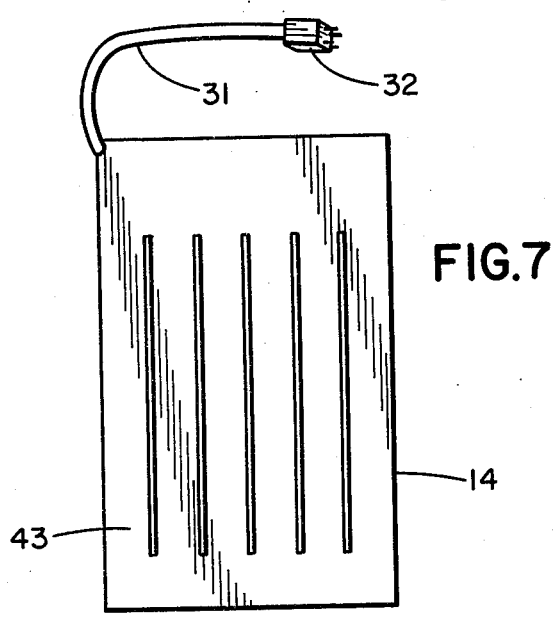
FIG. 7 is a plan view of a flexible outer heating pad in accordance with this invention.
Figure 8:
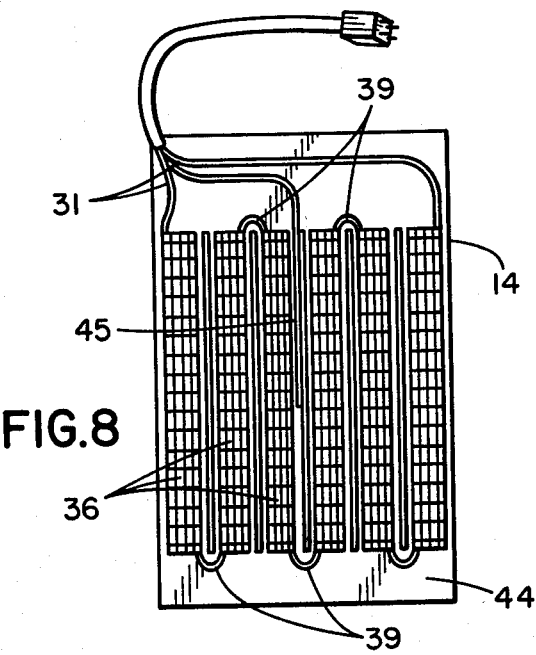
FIG. 8 is a plan view of a flexible outer heating pad of FIG. 7 with the top ply of flexible sheet material removed.
Figure 9:
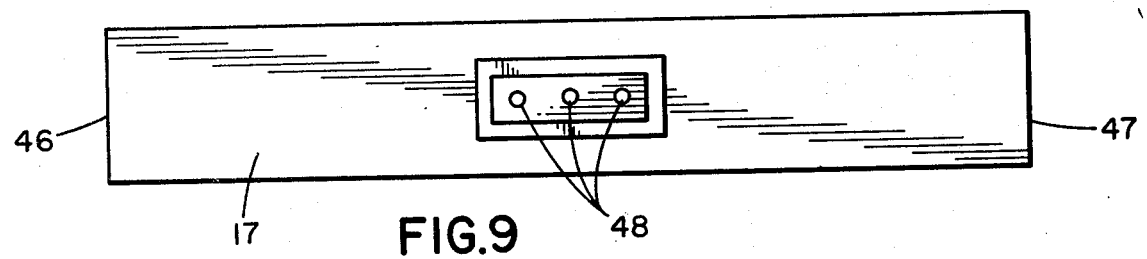
FIG. 9 is a plan view of the flexible sheet girdle in accordance with this invention.

This invention relates to repair of a cut 1 in a tire casing 2 which is larger than a mere nail puncture and which requires vulcanizing a rubber patch to the inner surface of the casing to form an airtight liner as well as vulcanizing material comprising a plug inserted into a skived cavity which opens to the outer surface of the tire casing.

A tire casing 2 is shown in FIG. 1 having a wound 1 around which a cavity 3 opening to the outer surface has been skived. FIG. 2 shows a portion of the inner surface 4 of the casing in the wound area which has been buffed and prepared for applying the patch 5 which is to be vulcanized to the inner surface 4 of the casing 2. Rubber repair material 6 is plugged into the skived cavity 3 on the outside of the casing 2. When the repair materials 5 and 6 are in place over the wound area, an inner flexible heating pad 7 is placed against the patch 5 on the inside of the casing 2, a sheet of insulating rubber 8 is then placed against the heating pad 7 and an inner tube 9 is placed inside of the casing 2. The electrical conductors 10 leading from the flexible heating pad 7 extend outwardly from the casing 2 for connection to an electrical power source 11. These electrical conductors 10 are enclosed within a protective floating sheath assembly 12 for purposes to be described later hereinbelow. The tire casing 2 with the inner tube 9 inside is then mounted on a tire rim 13. An exterior flexible heating pad 14 is then placed over the wound area on the outside of the tire casing 2 with a sheet of insulating rubber 15 placed over the exterior heating pad and a flexible sheet airbag 16, which is inflatable, is placed over the sheet of insulating rubber 15. A flexible sheet belt or girdle 17 is then wrapped around the flexible sheet airbag 16 and around the tire casing 2 with each opposite end of the flexible sheet belt or girdle 17 tucked between the annular bead 18 of the tire casing 2 and the portion of the tire rim 13 in which the annular bead 18 is seated. The flexible belt or girdle 17 is drawn snugly against the flexible sheet airbag 16, so when the airbag 16 is inflated, it will apply pressure inwardly against the exterior heating pad 14.

The inner tube 9 is then inflated to an appropriate pressure sufficient to cause the inner heating pad 7 to bear firmly against the patch 5 and inner surface 4 of the tire casing 2 in the region of the wound area. When the inner tube 9 is inflated to such pressure, the annular beads 18 of the tire casing 2 seat tightly on the tire rim 13, thereby tightly sandwiching the tucked-in ends of flexible sheet girdle or belt 17 therebetween and holding such ends against slippage when the flexible sheet airbag 16 on the outside of the tire casing 2 is inflated. This airbag 16 is then inflated to substantially the same air pressure as the inner tube 9 inside of the tire casing 2, thereby applying substantially equivalent pressure against the exterior flexible heating pad 14 forcing it against the outer surface of the tire casing 2 around the repair area.

The exterior flexible heating pad 14 and the interior flexible heating pad 7 are then connected to appropriate sources of electrical power 11 to apply heat to the patch area on both the inner surface and outer surface of the tire casing 2.

The protective floating sheat 12 in which the electrical conductors 10 are enclosed which extend from the interior heating pad 7 includes a section of flexible metallic tubing 20 extending from the edge 21 of the interior heating pad 7 and terminating at an intermediate point 22, which is less than the distance from the interior heating pad to the edge of the tire rim 13 when the interior heating pad 7 is mounted in place within the tire casing 2. A second length of flexible metallic tubing 23 extends from the opposite end of the electrical conductors inwardly thereof terminating at a point 24 which is preferably less than the distance from the electrical power source 11 to the tire rim 13. A floating section of flexible metallic tubing 25 of larger diameter than the diameter of the other two sections of flexible metallic tubing 20 and 23 is placed over the electrical conductors 10, and the opposite ends 26 and 27 of the larger diameter flexible metallic tubing 25 overlap respectively each of the smaller diameter metallic tubular conduit sections 20 and 23 a sufficient extent so when the larger diameter section of flexible tubular metallic conduit 25 is moved toward the edge 21 of the interior flexible heating pad 7 until one end 26 touches the heating pad the other end 27 of the section of larger diameter flexible metallic tubular conduit 25 is still overlapping the section of smaller diameter flexible tubular metallic conduit 23 that extends inwardly from the end of the electrical conductors 10 adjacent to the electrical power source 11. Similarly when the section of the larger diameter metallic tubular conduit 25 is moved reciprocally in the opposite direction until one of its ends 27 is adjacent to the electrical connector 28 which will connect it to the electrical power source 11, the opposite end 26 of the larger diameter tubular metallic conduit 25 still overlaps a portion of the smaller diameter tubular metallic conduit 20 which extends outwardly from an edge 21 of the interior flexible heating pad 7. Such construction of the protective floating sheath 12 results in the larger diameter tubular metallic conduit 25 extending between the two halves 29 and 30 of the tire rim 13 when the interior heating pad 7 is in place, with the electrical conductors 10 extending outwardly of the casing 2 for connection to an electrical power source 11. The larger diameter metallic tubular conduit 25 resists compression between the two halves 29 and 30 of the tire rim 13 so as to permit the electrical conductors enclosed therein to move freely. Such movement is essential to prevent the electrical conductors 10 from being stretched to the breaking point which would otherwise be the case, since during the curing process, while heat is being applied to the patch area of the tire casing 2, the tire casing 2 will "grow" to a certain extent. When that happens, the inflated inner tube 9 which is applying pressure against the interior heating pad 7 forces the interior heating pad 7 to move with the expanded tire casing 2 in order to keep the interior flexible heating pad 7 in close contact with the inner surface of the tire casing 2 in the patch area. The protective sheath 12 comprising the larger diameter metallic tubular conduit 25 provides a channel between the two halves 29 and 30 of the tire rim 13 and thereby allows the conductors 10 to move with the interior flexible heating pad 7 and thus prevents breaking of the electrical conductors 10.

The exterior heating pad 14 includes electrical conductors 31 leading to the electrical power source 11, and connected thereto by a connector 32.

The inner tube 9 and flexible airbag 16 are inflated to the desired pressure by a common source of compressed air in the compressed air line 33. An air hose 34 connected to line 33 leads to the inner tube 9, and a second air hose 35 connected to line 33 leads to the flexible airbag 16 on the outside of the tire casing 2.

When the inner heating pad 7 is in place against the patch on the inner surface of the casing 2, with inner tube 9 also in place to bear against heating pad 7 and the rubber strip 8, and when outer heating pad 14 is in place against the outer surface of the casing 2 and plug of repair material 6 with flexible airbag 16 bearing against the outer heating pad 14 and strip of rubber 15, the flexible sheet belt or girdle 17 is wrapped around the entire assembly with its ends tucked between the annular beads 18 of the tire casing 2 and the rim 13 as described above. The inner tube 9 and inflatable airbag 16 are then connected to the source of compressed air in line 33 through the respective air hoses 34 and 35, and both are inflated to the same desired pressure.

The inner heating pad 7 and the outer heating pad 14 are connected to the electrical power source 11 which is set for the desired vulcanizing temperature, thereby applying heat to the inner and outer surfaces of the casing 2 at the patch area for a predetermined period of time to vulcanize the patch to the casing 2.

It is important that the heating surface of the flexible heating pads 7 and 14 be held against the respective inner and outer surfaces of the casing 2, and patch materials 5 and 6, throughout their entire surface areas during the vulcanizing process. To prevent buckling of portions of the heating pads as pressure is applied, special construction of the inner heating pad 7 in particular is provided in accordance with this invention.

The inner heating pad 7 includes a plurality of elongated strips of electric heating tape 36 sancwiched between two plies or sheets 37 and 38 of flexible sheet material, such as high temperature nylon, each strip electrically interconnected by loosely looped connecting conductors 39 and ultimately connected to conductors 10 leading to the electrical power source 11.

The plies of flexible sheet material 37 and 38 are divided into a plurality of elongated pockets 40 by stitched seams 41, the length and width of pockets 40 corresponding to that of the elongated strips of electrical tape 36 received therein but sufficiently larger to permit both lateral and longitudinal movement of each strip 36 within its respective pocket 40. The elongated pockets 40 are arranged in parallel relationship across the width of the flexible sheet material, each containing a strip of electrical tape 36 therein to provide a relatively continuous heating surface across the width of the heating pad 7.

An additional elongated pocket 42 is provided across the top extending in a lateral direction normal to that of the elongated pockets 40. An elongated strip of electrical tape 36 is received in pocket 42, the length and width of pocket 42 corresponding to that of the elongated strip of electrical tape 36 received therein but sufficiently larger to permit both lateral and longitudinal movement of the strip 36 within the pocket 42.

The structure of the inner heating pad 7 as described above permits the respective strips of electrical heating tape 36 to shift position laterally and longitudinally as the heating pad 7 is being squeezed against the inner patch 5 by pressure of the inner tube 9 as it is inflated. Such shifting of position by the strips 36 within their respective pockets 40 and 42, enables the surface of the heating pad 7 and the strips 36 to avoid buckling and creasing as the surface of the heating pad 7 is forced to assume a convex exterior configuration as it is pressed ever tighter against the corresponding concave configuration of the inner surface of the tire casing 2. If creasing and buckling of the inner heating pad 7 were allowed to occur, as it would if the strips of electrical heating tape 36 were held in relatively fixed position within the pad 7 unable to shift laterally and longitudinally, portions of the strips 36 would not be in intimate contact with corresponding facing portions of the inner patch 5. Such portions of the patch 5 would therefore not be heated, or would not be heated uniformly at the same temperature as the other portions of the patch 5 which were in intimate contact with the heating pad 7. The result would be a relatively poorer job of vulcanization of the patch 5 to the tire casing 2. Thus, by providing structure as described to avoid buckling and creasing of the heating pad 7 as it is pressed against the inner patch 5, the present invention results in improved vulcanization of the inner patch 5 to the inner surface of the tire casing 2.

The outer heating pad 14 also includes a plurality of elongated strips of electric heating tape 36 sandwiched between two plies or sheets 43 and 44 of flexible sheet material, such as high temperature nylon, each strip electrically interconnected by loosely looped connecting conductors 39 and ultimately connected to conductors 31 leading to the electrical power source 11.

The plies of flexible sheet material 43 and 44 are divided into a plurality of elongated pockets 40 by stitched seams 41 similar to those in the inner heating pad 7. The length and width of each pocket 40 corresponds to that of the elongated strips of electrical tape 36 received therein, similar to the description of the inner heating pad 7 in this regard.

The inner and outer heating pads 7 and 14 respectively, also include a thermocouple element 45 extending into the mid-region of each heating pad, and each is connected to a separate thermostat mounted at the control console for the electric power source 11. The thermostats are connected to control the current passing through the respective heating pads 7 and 14 to maintain a constant pre-selected temperature for each heating pad during the time set for the curing or vulcanization process.

The flexible belt or girdle 17 comprises a length of sheet material, which may be high temperature nylon, the width of which is sufficient to span the length of the flexible inflatable airbag 16 and outer heating pad 14 when in place over the patch area on the outside of the tire casing 2. The length of the flexible belt or girdle is sufficient to encircle the inflatable airbag 16, the outer heating pad 14 in place under the airbag 16, and the tire casing 2 with sufficient material left at each end 46 and 47 to tuck between the annular beads 18 of tire casing 2 and the tire rim 13. When the inner tube 9 is inflated putting pressure against the annular beads 18 forcing them more securely against the corresponding portions of rim 13, the ends 46 and 47 of the flexible belt 17 are gripped tightly enough to hold the flexible belt 17 against slippage. Then when the flexible airbag 16 outside of the tire casing is inflated, the tightly gripped flexible belt 17 bearing against the air bag 16 forces and directs its expansion against the outer heating pad 14 forcing it into intimate contact with repair area on the outside surface of the tire casing 2.

The flexible belt 17 includes apertures 48 through which the valve 49 of flexible airbag 16 extends as shown in FIG. 3. The flexible airbag 16 may have an integrally formed hose or tube 35 extending therefrom for connection to the pressurized air source 33, and such hose or tube 35 may extend through an aperture 48 in flexible belt 17 in the same manner as shown in FIG. 3, or it may extend outwardly from one side edge of the flexible belt 17 as shown in FIG. 4.

The temperature of the heating pads 7 and 14 may be set and controlled by the respective controls 49 and 50 of the control console of electrical power source 11, as can the duration of the heating cycle. The thermocouples 45 in each heating pad as described above are connected to thermostats which control the current to each heating pad and thereby maintain the temperature of each pad constant at the preselected control setting.

I claim:

1. Tire repair apparatus, comprising a first flexible heating pad for placement against a patch on the concave inner surface of a section of tire casing to be repaired, a first flexible inflatable member for insertion into said tire casing to hold said first flexible heating pad against said patch when said first flexible inflatable member is inflated, a second flexible heating pad for placement against the outer surface of said section of tire casing to be repaired, a second flexible inflatable member for placement against said second flexible heating pad to hold said second flexible heating pad against said outer surface of said section of tire casing when said second flexible inflatable member is inflated, and securing means to retain said second flexible inflatable member in place against said second flexible heating pad to expand thereagainst as said second inflatable member is inflated, wherein said first flexible heating pad includes a holder of flexible sheet material, a plurality of elongated pockets in said holder in closely spaced apart relationship, a strip of electrical heating tape in each of said elongated pockets, connecting conductors to loosely connect said strips of elongated heating tape having width and length dimensions corresponding to those of said elongated pockets but being sufficiently smaller to permit free floating lateral and longitudinal movement of said strips within said pockets relative to each other and relative to said pockets when said first flexible heating pad is being forced against said concave inner surface of said tire casing by inflation of said first flexible inflatable member thereby avoiding buckling and creasing of said flexible heating pad as it is pressed against said concave inner surface.

2. Tire repair apparatus, comprising a first flexible heating pad for placement against a patch on the concave inner surface of a section of tire casing to be repaired, a first flexible inflatable member for insertion into said tire casing to hold said first flexible heating pad against said patch when said first flexible inflatable member is inflated, a second flexible heating pad for placement against the outer surface of said section of tire casing to be repaired, a second flexible inflatable member for placement against said second flexible heating pad to hold said second flexible heating pad against said outer surface of said section of tire casing when said second flexible inflatable member is inflated, and securing means to retain said second flexible inflatable member in place against said second flexible heating pad to expand thereagainst as said second inflatable member is inflated, wherein said tire casing is mounted on a tire rim, the annular beads of said tire casing being seated in said tire rim, said first flexible heating pad includes electrical conductors leading therefrom between one of said annular beads of said tire casing and said tire rim to an exterior electrical power source, a protective sheath surrounding said electrical conductors, said sheath being sandwiched between said one annular bead and said tire rim and extending both inwardly of said tire rim and outwardly thereof, a passageway through said protective sheath when in place relative to said tire rim and said annular bead of said casing to permit free movement of said electrical conductors as said first flexible heating pad to which they are connected is moved outwardly away from said tire rim and the point where said conductors exit from said tire rim to the exterior as a result of expansion of said tire casing during the heating cycle and movement therewith of said first flexible heating pad by virtue of said first flexible inflatable member pressing thereagainst.

3. Tire repair apparatus as set forth in claim 2, wherein said protective sheath surrounding said electrical conductors includes a first length of flexible metal tubing extending from the end of said conductors which is attached to said first flexible heating pad terminating in a free end at a first intermediate point which is less than half the length of said electrical conductors, a second length of flexible metal tubing extending from the opposite end of said electrical conductors terminating in a free end at a second intermediate point which is less than half the length of said electrical conductors, a third length of flexible metallic tubing having a diameter larger than that of said first and second lengths, said free ends of said first and second lengths of flexible metal tubing being slidably received in respective opposite ends of said third length, said third length being positioned at and extending on each side of the point where said electrical conductors exit from between said tire rim and said annular bead of said casing to the exterior when said first flexible heating pad is in place against the inner surface of said tire casing and said conductors are connected to said exterior electrical power source.

\* \* \* \* \*

UNITED STATES PATENT OFFICE
CERTIFICATE OF CORRECTION

Patent No. 4,284,451      Dated August 18, 1981

Inventor(s) Glenn R. Conley

It is certified that error appears in the above-identified patent and that said Letters Patent are hereby corrected as shown below:

In the Claims, Column 7, Claim 1, Line 63 reads "loosely connect said strips of elongated heating tape" should be corrected to read -- loosely connect said strips of electrical heating tape respectively in series, said strips of elongated heating tape -- .

Signed and Sealed this

Sixteenth Day of February 1982

[SEAL]

Attest:

GERALD J. MOSSINGHOFF

Attesting Officer      Commissioner of Patents and Trademarks